US008508890B2

(12) United States Patent

Zheng et al.

(10) Patent No.: US 8,508,890 B2

(45) Date of Patent: Aug. 13, 2013

(54) ARC EXTINGUISHING HYBRID TRANSFER SWITCH AND SWITCHING METHOD

(75) Inventors: Dapeng Zheng, Shenzhen (CN); Frank Heerdt, Shenzhen (CN); Zixia Sang, Shenzhen (CN)

(73) Assignee: ASCO Power Technologies, L.P., Florham Park, NJ (US)

( * ) Notice: Subject to any disclaimer, the term of this patent is extended or adjusted under 35 U.S.C. 154(b) by 257 days.

(21) Appl. No.: 13/051,718

(22) Filed: Mar. 18, 2011

(65) Prior Publication Data

US 2011/0292551 A1 Dec. 1, 2011

(30) Foreign Application Priority Data

May 27, 2010 (CN) .......................... 2010 1 0184973

(51) Int. Cl.

*H02H 3/00* (2006.01)
*H01H 9/30* (2006.01)
*H01H 73/18* (2006.01)

(52) U.S. Cl.

USPC ...................................... 361/8; 361/13; 361/2

(58) Field of Classification Search

USPC .................................................... 361/8, 2, 13

See application file for complete search history.

(56) References Cited

U.S. PATENT DOCUMENTS 5,854,729 A * 12/1998 Degeneff et al. ................. 361/4
5,867,356 A * 2/1999 Duggal et al. .................. 361/13
6,051,893 A * 4/2000 Yamamoto et al. ............ 307/43

* cited by examiner

*Primary Examiner* — Scott Bauer

(74) *Attorney, Agent, or Firm* — Harness, Dickey & Pierce, P.L.C.

(57) ABSTRACT

The present invention discloses an arc extinguishing hybrid transfer switch, including a mechanical switch and a first thyristor branch connected in parallel with the first contact branch of the mechanical switch, wherein the first thyristor branch includes a first thyristor, a second thyristor, a first polarized capacitor and a second polarized capacitor, the first thyristor and the first polarized capacitor are connected in series in the same direction, the second thyristor and the second polarized capacitor are connected in series in the same direction, and a branch consisted of the first thyristor and the first polarized capacitor and a branch consisted of the second thyristor and the second polarized capacitor are connected in parallel in reverse direction. The invention further discloses a switching method for the arc extinguishing hybrid transfer switch for implementing an arc extinguishing of a mechanical switch. In the invention, a low-power thyristor may be used, thus the cost of the switch may be lowered greatly. Moreover, the thyristor may be replaced by the polarized capacitor for implementing the arc extinguishing when a short-circuit failure occurs on the thyristor. Thus, the load current is lowered greatly and the influence of thyristor failure on the load is reduced.

8 Claims, 4 Drawing Sheets

ARC EXTINGUISHING HYBRID TRANSFER SWITCH AND SWITCHING METHOD

FIELD OF THE INVENTION

The present invention relates to power electronic devices, and in particular, to an arc extinguishing hybrid transfer switch and a switching method.

BACKGROUND OF THE INVENTION

Automatic Transfer Switch (ATS) is an electric device that switches one or more load circuits from a power supply to another power supply, and is widely used in various situations. Because the main switching component of the ATS is a mechanical switch, the switching speed is slow (about 20 ms) and it is easy to cause an arc. The arc may cause a high temperature, ignite and vaporize the metal contact of the mechanical switch, and thus greatly reduce the life time of the switch.

Static Transfer Switch (STS) is an electric device that switches one or more load circuits from one power supply to another power supply, and is used in various situations having high requirements for switching speed. The main switch component of STS is a thyristor. Although the switching speed of thyristor (less than 3 ms) is greatly increased over ATS, due to the fact that the thyristor is a semiconductor rather than a conductor, the thyristor has a turn-on voltage drop that is much higher than that of a mechanical switch made of conductor. Thus, the turn-on loss is increased. Moreover, the cost of high-power thyristor is high, and the product cost is also greatly increased. The STS is even more expensive than an uninterruptable power supply (UPS) with the same capacity.

It is an urgent requirement that a switch has a low turn-on loss, a fast switching speed, a long life time, a good protection for load during failure and a low price.

Part of the above requirements may be satisfied by simply connecting a thyristor and a mechanical switch in parallel, but this is only applicable for situations with low power. When the switch is an ATS, the product cost becomes very high due to the high power requirement for the thyristor, for example, in the situation of a current of 63 A, 230 A, 3 kA and 4 kA. Meanwhile, when a short-circuit failure occurs on the thyristor, the power supply directly supplies power to a load via the thyristor branch, and the mechanical switch is bypassed. Thus, the mechanical switch does not work even if the mechanical switch is triggered, and a threat is caused for the load. A patent in which a thyristor and a mechanical switch are simply connected in parallel as described above is filed with USPTO as early as in 1984, however, no corresponding product can be found today though about 20 years past. Thus, the deficiency and shortcoming of the patent may be reflected.

SUMMARY OF THE INVENTION

Considering the deficiency of the prior art, an object of the present invention is to provide an arc extinguishing hybrid transfer switch and a switching method so as to lower the high power requirement for the thyristor and product cost and avoid the bypassing of the mechanical switch when the short-circuit failure occurs on the thyristor.

To attain the above object, the invention employs the following technical solutions.

An arc extinguishing hybrid transfer switch, including a mechanical switch and a first thyristor branch connected in parallel with a first contact branch of the mechanical switch, wherein, the first thyristor branch includes a first thyristor, a second thyristor, a first polarized capacitor and a second polarized capacitor, the first thyristor and the first polarized capacitor are connected in series in the same direction, the second thyristor and the second polarized capacitor are connected in series in the same direction, and a branch consisted of the first thyristor and the first polarized capacitor and a branch consisted of the second thyristor and the second polarized capacitor are connected in parallel in reverse direction.

Preferably, the arc extinguishing hybrid transfer switch further includes a first discharge circuit connected in parallel with the first polarized capacitor and a second discharge circuit connected in parallel with the second polarized capacitor.

The arc extinguishing hybrid transfer switch further includes a current-limiting part connected in series with the first thyristor branch.

The arc extinguishing hybrid transfer switch further includes a second thyristor branch connected in parallel with the second contact branch of the mechanical switch, the second thyristor branch comprises a third thyristor, a fourth thyristor, a third polarized capacitor and a fourth polarized capacitor, the third thyristor and the third polarized capacitor are connected in series in the same direction, the fourth thyristor and the fourth polarized capacitor are connected in series in the same direction, and a branch consisted of the third thyristor and the third polarized capacitor and a branch consisted of the fourth thyristor and the fourth polarized capacitor are connected in parallel in reverse direction.

The arc extinguishing hybrid transfer switch further includes a third discharge circuit connected in parallel with the third polarized capacitor and a fourth discharge circuit connected in parallel with the fourth polarized capacitor.

A switching method for the above arc extinguishing hybrid transfer switch, including:

a. emitting a switching signal;

b. triggering the first thyristor branch to be in turned on, thereby flowing a current through the branch consisted of the first thyristor and the first polarized capacitor, or flowing a current through the branch consisted of the second thyristor and the second polarized capacitor;

c. making the mechanical switch depart from the first contact and supplying power to the load by the current via the first thyristor branch;

d. stopping triggering a first bidirectional thyristor unit when it is detected that the mechanical switch departs from the first contact and reaches a safe distance which unable to cause an arc.

Preferably, the method further includes the following step after step d: discharging the first polarized capacitor and the second polarized capacitor.

The method further includes the following steps after step d:

e. after detecting that no current flows through the first thyristor branch, triggering the second thyristor branch to be turned on, and flowing a current through the branch consisted of the third thyristor and the third polarized capacitor or flowing a current through the branch consisted of the fourth thyristor and the fourth polarized capacitor, so as to supply power to the load;

f. after detecting that the mechanical switch reaches the second contact, stopping triggering the second thyristor branch.

The method further includes the following step after step f: discharging the third polarized capacitor and the fourth polarized capacitor.

The invention has the following beneficial technical effects.

According to the invention, in the first thyristor branch connected in parallel with the mechanical switch, the first thyristor and the first polarized capacitor are connected in series in the same direction, the second thyristor and the second polarized capacitor are connected in series in the same direction, and a branch consisted of the first thyristor and the first polarized capacitor and a branch consisted of the second thyristor and the second polarized capacitor are connected in parallel in reverse direction. Firstly, because the thyristor has a property of automatic turn-off at current zero-crossing and high speed during switching, the non-contact and non-arc switching are realized. The impact on the circuit main switch, i.e., mechanical switch, is alleviated by using the first thyristor branch, and the arc occurring during mechanical switching is eliminated. Thus, the mechanical switch contact will not be ignited and vaporized by the high temperature of the arc, so that the life time of the mechanical switch is greatly prolonged. Moreover, the power dump time of the load caused by the slow speed of the mechanical switch is also reduced due to the rapid response of the thyristor relative to the mechanical switch. Secondly, the existence of the polarized capacitor may lower the power of the thyristor, so that a low-power thyristor may be used. Thus, the cost of thyristor may be lowered greatly. Moreover, when a short-circuit failure occurs on the thyristor, the thyristor is replaced by the polarized capacitor for implementing the arc extinguishing and the load current is lowered greatly. Therefore, the influence of thyristor failure on the load is reduced. Additionally, even if a failure occurs on a polarized capacitor after an impact current or a reverse current, the thyristor branch is kept open because the capacitor becomes open after the failure, thus no influence is laid on the load.

The characteristics and advantages of the invention will be explained in detail with reference to the embodiments of the invention in conjunction with the drawings.

DETAILED DESCRIPTION OF THE EMBODIMENTS

Referring to FIGS. 1-3 and FIG. 5, an arc extinguishing hybrid transfer switch includes a mechanical switch S and a first thyristor branch that is connected in parallel with the first contact branch P1 of a mechanical switch, wherein the first thyristor branch includes a first thyristor G1, a second thyristor G2, a first polarized capacitor C1 and a second polarized capacitor C2. The first thyristor G1 and the first polarized capacitor C1 are connected in series in the same direction, the second thyristor G2 and the second polarized capacitor C2 are connected in series in the same direction, and a branch consisted of the first thyristor G1 and the first polarized capacitor C1 and a branch consisted of the second thyristor G2 and the second polarized capacitor C2 are connected in parallel in reverse direction. It may be understood by those skilled in the art that, so called “in the same direction” refers to that the cathodes and the anodes of the polarized capacitor and the thyristor have the same order in the current flow direction.

Figure 1:
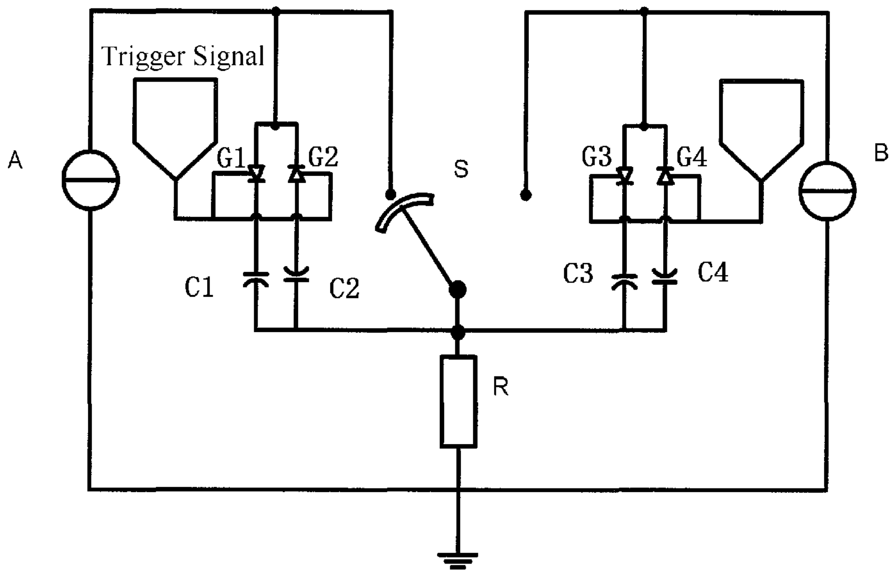
FIG. 1 is a topological graph of an arc extinguishing hybrid transfer switch according to one embodiment of the invention.

Referring to FIG. 1, in one embodiment, the arc extinguishing hybrid transfer switch further includes a second thyristor branch that is connected in parallel with the second contact branch P2 of the mechanical switch. The second thyristor branch includes a third thyristor G3, a fourth thyristor G4, a third polarized capacitor C3 and a fourth polarized capacitor C4. The third thyristor G3 and the third polarized capacitor C3 are connected in series in the same direction, the fourth thyristor G4 and the fourth polarized capacitor C4 are connected in series in the same direction, a branch consisted of the third thyristor G3 and the third polarized capacitor C3 and a branch consisted of the fourth thyristor G4 and the fourth polarized capacitor C4 are connected in parallel in reverse direction.

In the ATS application shown in FIG. 1, the first contact branch P1 of the mechanical switch is coupled to a normal power supply A, the second contact branch P2 of the mechanical switch is coupled to an emergency power supply B, and the mechanical switch switches between the first contact and the second contact to supply power to a load R.

Figure 2:
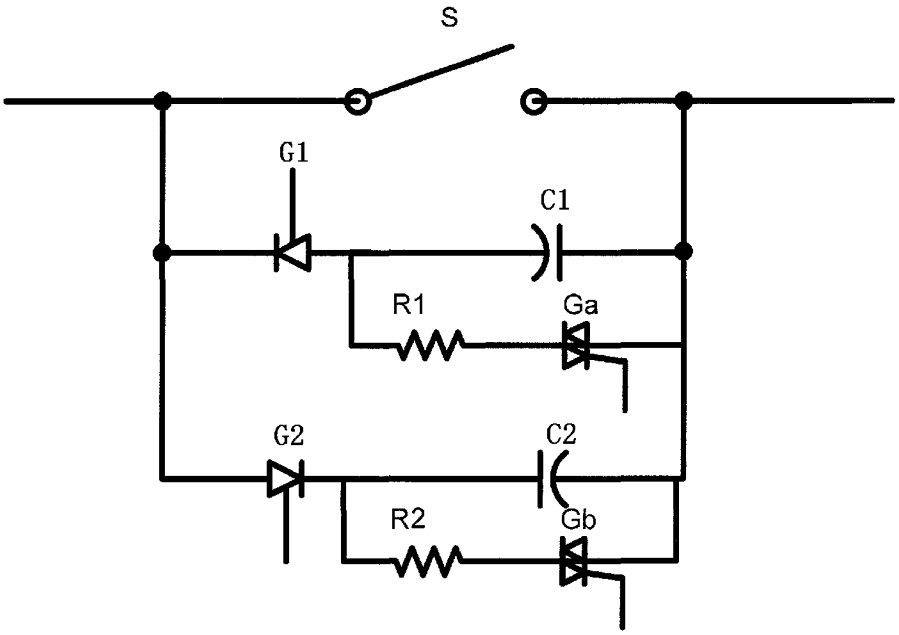
FIG. 2 is a circuit diagram of an arc extinguishing hybrid transfer switch according to an improved embodiment of the invention.

As shown in FIG. 2, in one preferred embodiment, a first discharge circuit is connected in parallel with the first polarized capacitor C1. The first discharge circuit preferably includes a discharge resistor R1 and a discharge bidirectional thyristor Ga connected in series. A second discharge circuit is connected in parallel with the second polarized capacitor C2. The second discharge circuit preferably includes a discharge resistor R2 and a discharge bidirectional thyristor Gb connected in series. The first discharge circuit and the second discharge circuit are respectively used for discharging the first polarized capacitor C1 and the second polarized capacitor C2 and eliminating the residual energy, thereby avoiding the current impact when the mechanical switch is switched. Also, a similar circuit arrangement may be employed for the second thyristor branch.

Furthermore, a thyristor buffer circuit (not shown) may be connected in parallel with the first thyristor G1 and the second thyristor G2 respectively. For example, the thyristor buffer circuit may be consisted of a capacitor and a resistor connected in series, for absorbing generated electric impulses. The thyristor buffer circuit may employ an RCD design to protect the thyristor from the impact of the impulse current voltage and to prolong the life time of the thyristor.

Figure 3:
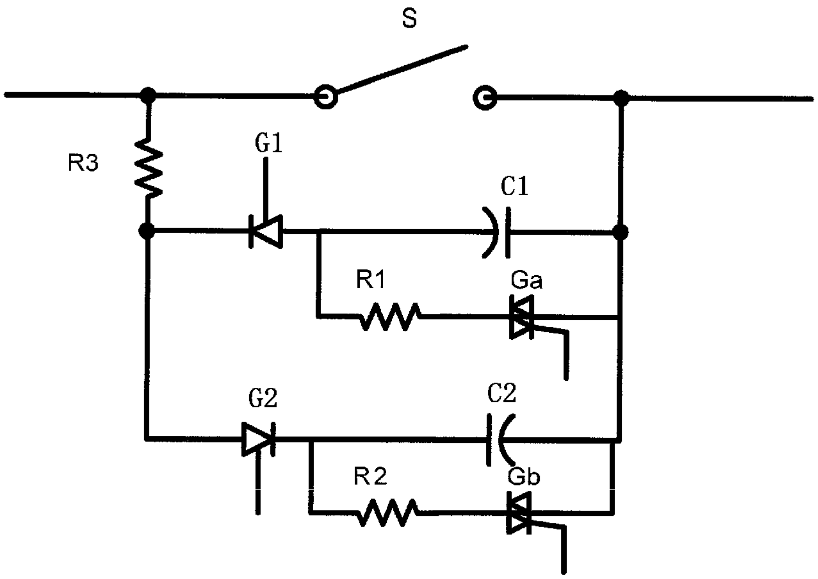
FIG. 3 is a circuit diagram of an arc extinguishing hybrid transfer switch according to another preferred embodiment of the invention.

As shown in FIG. 3, in a further preferred embodiment, a current-limiting resistor R3 (and moreover, a capacitor) is connected in series with the first thyristor branch, thereby the dependence on a large-capacity thyristor may be reduced by increasing the impedance of the first thyristor branch, and the required power of the thyristor may be lowered. In such a case, the resistance of the current-limiting resistor R3 (the capacitance of the capacitor) is selected appropriately. Because when the impedance of the main thyristor branch is large and exceeds the resistance of the air, the current may flow through the air that has a smaller resistance than the thyristor branch during switching, so that the arc still exists.

Figure 4:
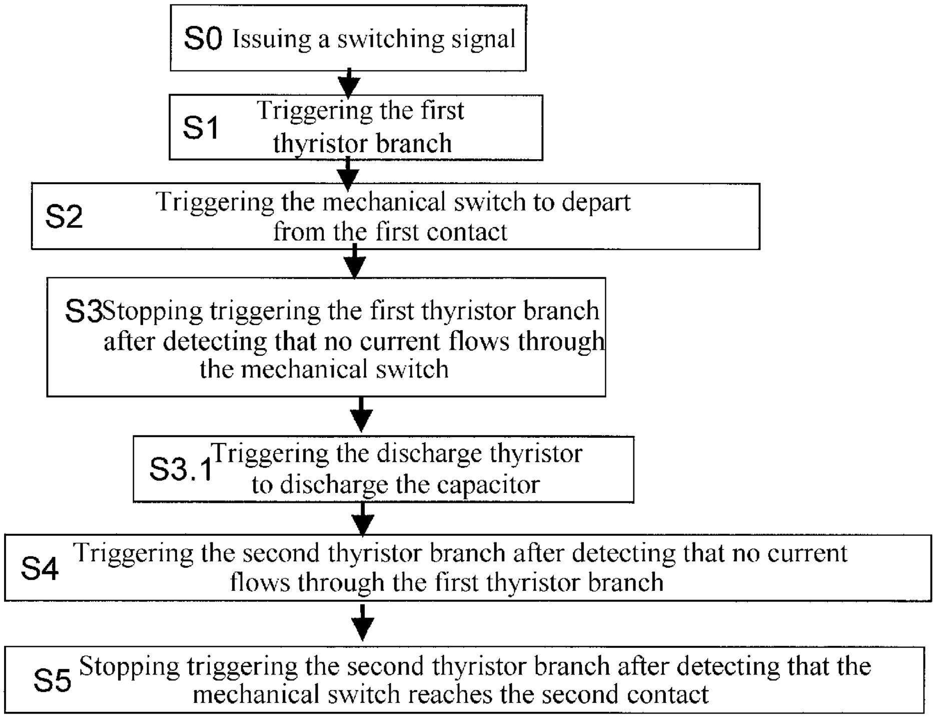
FIG. 4 is a flow chart of a switching method according to one embodiment of the invention.

The invention further provides a switching method for the above arc extinguishing hybrid transfer switch. The flow chart of the method according to one embodiment of the invention is as shown in FIG. 4.

Under normal conditions, the mechanical main switch is in the first contact, and the first thyristor branch is also in a cut-off state. Because the impedance of the mechanical switch is small and the impedances of the thyristor and the corresponding polarized capacitor are large, all of the current passes through the mechanical switch and the voltage drop and the turn-on loss both are almost zero.

In step S0, when a failure occurs on the normal power supply and the system needs to be switched to the emergency power supply, the system issues a switching signal. Next, in step S1, the first thyristor branch is triggered to be turned on. Then, in step S2, the mechanical switch begins to act: departs from the first contact and moves to the second contact, meanwhile, the current flows through load R via the first thyristor branch.

Because the first polarized capacitor C1 and the second polarized capacitor C2 with large impedance (the detailed specification may be selected according to the actual requirement) exist in the first thyristor branch, the current passing through the first thyristor branch may be lowered greatly. Therefore, the first thyristor G1 and the second thyristor G2 may be a low-power thyristor.

In step S3, after it is detected that the mechanical switch departs from the first contact and reaches a safe distance that is unable to cause an arc, the triggering of the first thyristor branch is stopped, so that the current in the first thyristor branch is automatically cut off at zero-crossing point.

In the above process, the non-arc turn-off of the normal power supply is realized.

Preferably, in step S4, after it is detected that no current passes through the first thyristor branch, the second thyristor branch is triggered to be turned on and to supply power to load. A dead zone time exists between the successive turn-on of the first thyristor branch and the second thyristor branch, thus it may be avoided that the short-circuit failure occurs when the normal power supply and the emergency power supply are connected together. After the mechanical switch reaches the second contact, the current flows through the mechanical switch that has a smaller impedance. In step S5, when it is detected that the mechanical switch reaches the second contact, the trigger signal of the second thyristor branch is stopped. Thus, the non-arc cut-in of the emergency power supply is realized.

When a short-circuit failure occurs on the thyristor, the first thyristor G1 or the second thyristor G2 shown in FIG. 2 is shorted, but the polarized capacitor is effective. Because the equivalent impedance of the polarized capacitor is large, the mechanical switch is not shorted. During switching, when the mechanical switch departs from the original first contact, the polarized capacitor absorbs the energy that is originally used to generate an arc. The capacity of the capacitor may be so designed that the capacitor is able to absorb enough energy for the mechanical switch moving to a safe distance that is unable to cause an arc. During the short-circuit failure on the thyristor, the normal power supply may supply the load via the polarized capacitor in the thyristor branch. Because of the large impedance of the capacitor, the current that reaches the load is very small and the influence on the load is lowered. Even if a failure occurs on a polarized capacitor after an impact current or a reverse current, the thyristor branch is kept open because the capacitor becomes open after the failure, thus no influence is laid on the load.

After switching, residual electricity may reside in the polarized capacitor. If the residual electricity is not eliminated, an impact may be caused in a loop including the polarized capacitor when switching back to the loop for the next time. Thus, step S3.1 is preferably added, in which a discharge bidirectional thyristor in the discharge circuit is triggered during a time interval between switching processes so as to discharge the capacitor for the next use.

The transfer switch and switching method of the invention utilize the properties of rapidness and automatic turn-off at current zero-crossing of the thyristor. The required power for the thyristor is lowered by using a polarized capacitor. Thus, a function of arc extinguishing for a mechanical switch is realized. Additionally, the mechanical switch may be used for electric conduction after switching and thus, the good electric conduction property of the mechanical switch may be obtained, the loss caused by turning on a thyristor may be lowered, and the energy may be saved. The existence of the polarized capacitor makes it possible to select a low-power thyristor, and the device cost may be lowered greatly. Meanwhile, when the short-circuit failure occurs on the thyristor, the polarized capacitor may replace the thyristor for arc extinguishing. Thus, the load current may be lowered greatly, and the influence of thyristor short-circuit failure on the load may be reduced.

Figure 5:
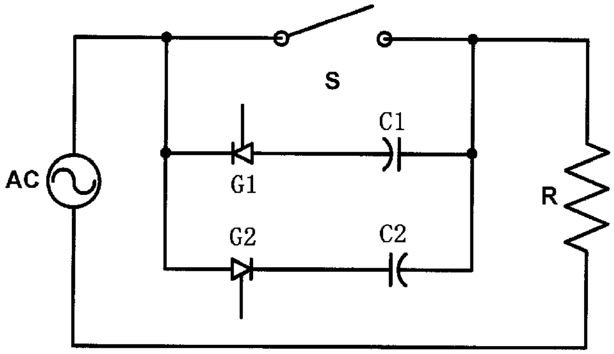
FIG. 5 is a schematic circuit diagram for testing the hybrid switch according to one embodiment of the invention.
Figure 6:
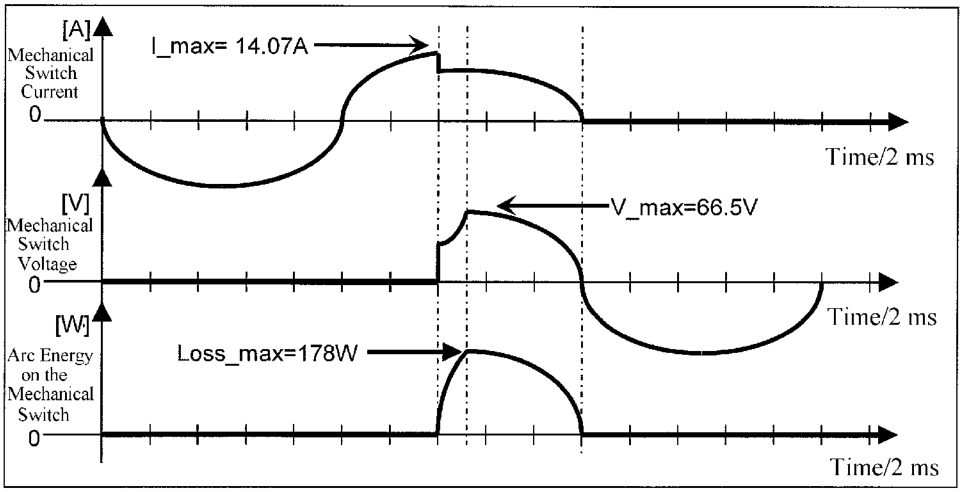
FIG. 6 is a diagram showing the current, voltage and arc energy during the switching of a traditional mechanical switch.
Figure 7:
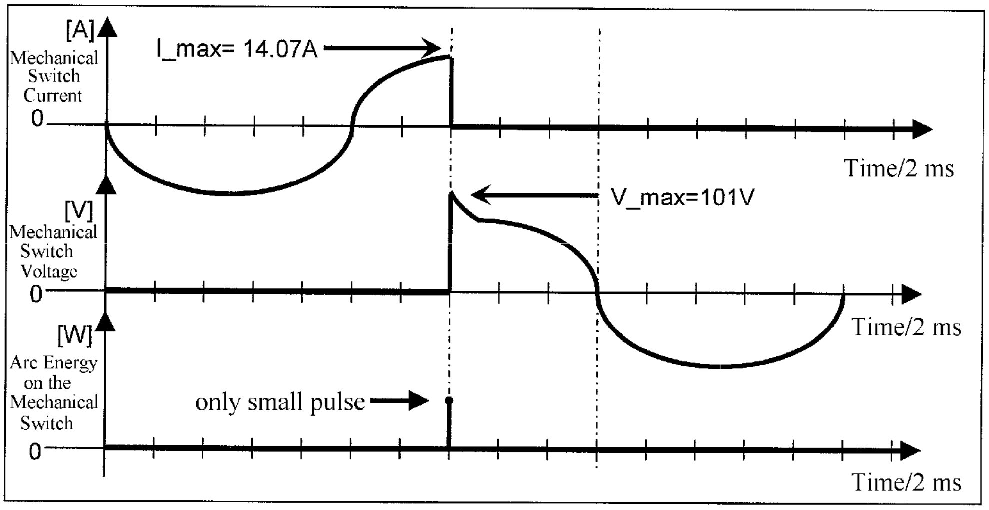
FIG. 7 is a diagram showing the current, voltage and arc energy during the switching of a mechanical switch according to an embodiment of the invention.
Figure 8:
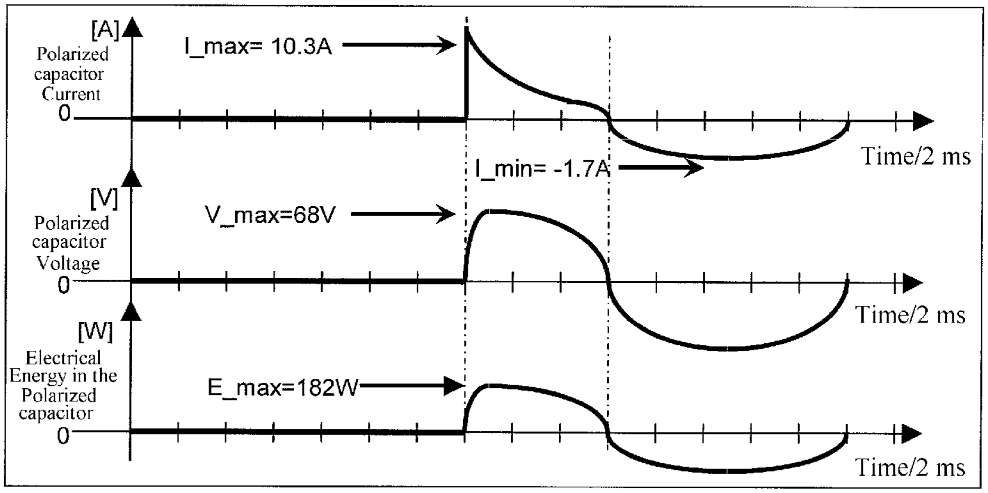
FIG. 8 is a diagram showing the current, voltage and arc energy after the thyristor short-circuit failure in the case that a polarized capacitor exists according to an embodiment of the invention.

The hybrid transfer switch is tested in an experimental environment of an AC voltage of 48V (RMS value) and a current of 10 A (RMS value), and the schematic circuit diagram is as shown in FIG. 5. Referring to FIG. 6 to FIG. 8, in comparison with the waveform generated during the switching of a traditional mechanical switch, the advantages of the invention becomes more apparent.

As shown in FIG. 6, an arc is generated when no thyristor and polarized capacitor is used, and in particular, a waveform relating to the arc, in which the current and voltage are non-zero at the same time, exists in FIG. 6.

As shown in FIG. 7, when a thyristor and a polarized capacitor are used, it may be observed that no arc is generated when a mechanical switch is turned on or off. In particular, by detecting the current and voltage on the mechanical switch via an oscilloscope, no waveform relating to the arc, in which the current and voltage are non-zero at the same time, exists in FIG. 7. Therefore, the function of arc extinguishing is realized by the hybrid transfer switch according to an embodiment of the invention.

As shown in FIG. 8, after the thyristor short-circuit failure, the polarized capacitor may still implement the function of arc extinguishing, and the equivalent large impedance of the polarized capacitor after switching may lower the current to the load and reduce the influence of thyristor failure on the load. It can be seen from FIG. 8 that the load current of 10 A (effective value, the same below) is lowered to a capacitor current (which equals to the load current) of 1.7 A, thus the influence on the load during the switching is reduced. In practice, it may be considered to use a capacitor with a smaller capacity, so as to obtain a larger impedance and lower the current of the capacitor to a smaller value, thereby implementing a better protection for the load.

The above contents are detailed illustrations of the invention in conjunction with specific preferred embodiments of the present invention; however, the present invention is not limited thereto. Various modifications and variations may be made by those skilled in the art without departing from the scope of the invention, and all these modifications and variations are contemplated to be within the scope of the invention.

The invention claimed is:

1. An arc extinguishing hybrid transfer switch, comprising a mechanical switch and a first thyristor branch connected in parallel with a first contact branch of the mechanical switch, wherein, the first thyristor branch comprises a first thyristor, a second thyristor, a first polarized capacitor and a second polarized capacitor, the first thyristor and the first polarized capacitor are connected in series in the same direction, the second thyristor and the second polarized capacitor are connected in series in the same direction, and a branch consisted of the first thyristor and the first polarized capacitor and a branch consisted of the second thyristor and the second polarized capacitor are connected in parallel in reverse direction, the arc extinguishing hybrid transfer switch further comprising: a first discharge circuit connected in parallel with the first polarized capacitor and a second discharge circuit connected in parallel with the second polarized capacitor.

2. The arc extinguishing hybrid transfer switch according to claim 1, further comprising: a current-limiting part connected in series with the first thyristor branch.

3. The arc extinguishing hybrid transfer switch according to any one of claims 1 or 2, further comprising: a second thyristor branch connected in parallel with a second contact branch of the mechanical switch, the second thyristor branch comprises a third thyristor, a fourth thyristor, a third polarized capacitor and a fourth polarized capacitor, the third thyristor and the third polarized capacitor are connected in series in the same direction, the fourth thyristor and the fourth polarized capacitor are connected in series in the same direction, and a branch consisted of the third thyristor and the third polarized capacitor and a branch consisted of the fourth thyristor and the fourth polarized capacitor are connected in parallel in reverse direction.

4. The arc extinguishing hybrid transfer switch according to claim 3, further comprising: a third discharge circuit connected in parallel with the third polarized capacitor and a fourth discharge circuit connected in parallel with the fourth polarized capacitor.

5. A switching method for an arc extinguishing hybrid transfer switch, the arc extinguishing hybrid transfer switch comprising a mechanical switch and a first thyristor branch connected in parallel with a first contact branch of the mechanical switch, wherein, the first thyristor branch comprises a first thyristor, a second thyristor, a first polarized capacitor and a second polarized capacitor, the first thyristor and the first polarized capacitor are connected in series in the same direction, the second thyristor and the second polarized capacitor are connected in series in the same direction, and a branch consisted of the first thyristor and the first polarized capacitor and a branch consisted of the second thyristor and the second polarized capacitor are connected in parallel in reverse direction, the arc extinguishing hybrid transfer switch further comprising: a first discharge circuit connected in parallel with the first polarized capacitor and a second discharge circuit connected in parallel with the second polarized capacitor;

wherein the switching method comprises:

a. emitting a switching signal;

b. triggering the first thyristor branch to be turned on, thereby flowing a current through the branch consisted of the first thyristor and the first polarized capacitor, or flowing a current through the branch consisted of the second thyristor and the second polarized capacitor;

c. making the mechanical switch depart from the first contact and supplying power to a load by the current via the first thyristor branch; and d. stopping triggering a first bidirectional thyristor unit when it is detected that the mechanical switch departs from the first contact and reaches a safe distance which is unable to cause an arc.

6. The switching method according to claim 5, further comprising the following step after step d: discharging the first polarized capacitor and the second polarized capacitor.

7. The switching method according to claim 5 or 6, further comprising the following step after step d:

e. after detecting that no current flows through the first thyristor branch, triggering a second thyristor branch to be turned on, and flowing a current through a branch consisted of a third thyristor and a third polarized capacitor or flowing a current through a branch consisted of a fourth thyristor and a fourth polarized capacitor, so as to supply power to the load; and f. after detecting that the mechanical switch reaches a second contact, stopping triggering the second thyristor branch.

8. The switching method according to claim 7, further comprising the following step after step f: discharging the third polarized capacitor and the fourth polarized capacitor.

* * * * *